United States Patent
Vaz-Pocas et al.

(10) Patent No.: US 10,034,558 B2
(45) Date of Patent: Jul. 31, 2018

(54) PRODUCT DISPLAY SYSTEMS AND METHODS

(71) Applicant: PepsiCo, Inc., Purchase, NY (US)

(72) Inventors: Daniel Vaz-Pocas, Yonkers, NY (US); Christian Stolarz, Purchase, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 15/251,785

(22) Filed: Aug. 30, 2016

(65) Prior Publication Data
US 2018/0055248 A1 Mar. 1, 2018

(51) Int. Cl.
| | |
|---|---|
| *A47F 3/04* | (2006.01) |
| *G06K 7/10* | (2006.01) |
| *G06K 19/06* | (2006.01) |
| *G06K 19/07* | (2006.01) |
| *G09F 7/02* | (2006.01) |
| *G09F 7/18* | (2006.01) |

(52) U.S. Cl.
CPC ........ *A47F 3/0426* (2013.01); *G06K 7/10297* (2013.01); *G06K 19/06037* (2013.01); *G06K 19/0723* (2013.01); *G09F 7/02* (2013.01); *G09F 7/18* (2013.01)

(58) Field of Classification Search
CPC .......... A47F 3/0426; A47F 3/043; G09F 7/02; G09F 7/18; G09F 7/10
See application file for complete search history.

(56) References Cited

U.S. PATENT DOCUMENTS

| | | | | |
|---|---|---|---|---|
| 4,035,940 A | * | 7/1977 | Mickey | G09F 7/08 |
| | | | | 40/590 |
| 5,448,844 A | * | 9/1995 | Miller, Jr. | G09F 7/10 |
| | | | | 40/306 |
| 6,230,426 B1 | | 5/2001 | Fakhoury et al. | |
| 7,556,159 B2 | * | 7/2009 | Robertson | A47B 96/02 |
| | | | | 211/75 |
| 8,341,861 B2 | * | 1/2013 | Matsushita | E05B 37/00 |
| | | | | 40/111 |
| 2003/0222037 A1 | * | 12/2003 | Belokin | A47F 5/0043 |
| | | | | 211/75 |

(Continued)

FOREIGN PATENT DOCUMENTS

| | | |
|---|---|---|
| JP | 2003-323665 A | 11/2003 |
| JP | 2014-085850 A | 5/2014 |
| WO | WO 2013-033555 A1 | 3/2013 |

OTHER PUBLICATIONS

Booth, M. Vending Machines Get Soda Calorie Counts Before You Press the Button, The Denver Post, Aug. 23, 2013.

(Continued)

*Primary Examiner* — Gary C Hoge
(74) *Attorney, Agent, or Firm* — Sterne, Kessler, Goldstein & Fox P.L.L.C.

(57) ABSTRACT

A product display may include a product swatch frame having a plurality of convex surfaces extending towards a front surface and defining product swatch support surfaces configured to support a swatch including a product identifier; and a flange configured to position the swatch provided between an adjacent pair of convex surfaces. A product merchandising system may include a housing having a front surface; and a product display disposed proximate the front surface.

20 Claims, 6 Drawing Sheets

(56) References Cited

U.S. PATENT DOCUMENTS

| | | | | |
|---|---|---|---|---|
| 2004/0128886 A1* | 7/2004 | Case | ......................... | G09F 7/00 |
| | | | | 40/605 |
| 2005/0193607 A1* | 9/2005 | Maman | ..................... | G09F 3/20 |
| | | | | 40/620 |
| 2013/0204698 A1* | 8/2013 | Bryant | ............... | G06Q 30/0253 |
| | | | | 705/14.51 |

OTHER PUBLICATIONS

International Search Report and Written Opinion of the International Searching Authority directed to related International Patent Application No. PCT/US2017/047067, dated Nov. 6, 2017; 8 pages.

* cited by examiner

PRODUCT DISPLAY SYSTEMS AND METHODS

FIELD

The described embodiments relate generally to a product display system. In particular, embodiments relate to product display systems for use with product merchandising systems such as coolers or vending machines.

BACKGROUND

Various systems and methods for displaying products for sale may be used.

SUMMARY

Some embodiments are directed to a product display. The product display may include a product swatch frame. The product swatch frame may include plurality of convex surfaces extending towards a front surface. The convex surfaces may define product swatch support surfaces. Support surfaces may be configured to support a swatch. The swatch may include a product identifier. The product swatch frame may include a flange configured to position the swatch provided between an adjacent pair of convex surfaces.

In some embodiments, the product display may include second product swatch frame having a plurality of convex surfaces extending towards a front surface and defining product swatch support surfaces configured to support a swatch including a product identifier. The second product swatch frame may also have a flange configured to position the swatch provided between an adjacent pair of convex surfaces, wherein each of the first and second product swatch frame include a terminal end having a mating surface configured to coact with the opposing mating surface to define one of the plurality of convex surfaces. In some embodiments, the convex surface defined by the first and second product swatch frames defines a product swatch support surface, and a first flange configured to locate the swatch is provided on the first product swatch frame and a second flange configured to locate the swatch is provided on the second product swatch frame.

In some embodiments, the swatch frame includes an edge structure at a terminal end of the frame and configured to mate to a product display housing. In some embodiments, the flange is configured as a substantially T-shaped protrusion such that a first side of the protrusion is configured to support an edge of a swatch and a second side of the protrusion is configured to support an edge of a different swatch. In some embodiments, a portion of the product swatch frame is processed to increase light diffraction. In some embodiments, the swatch is held in place by friction between an edge of the swatch and the product swatch frame and is removable. In some embodiments, the product swatch frame is extruded plastic.

Figure 2:
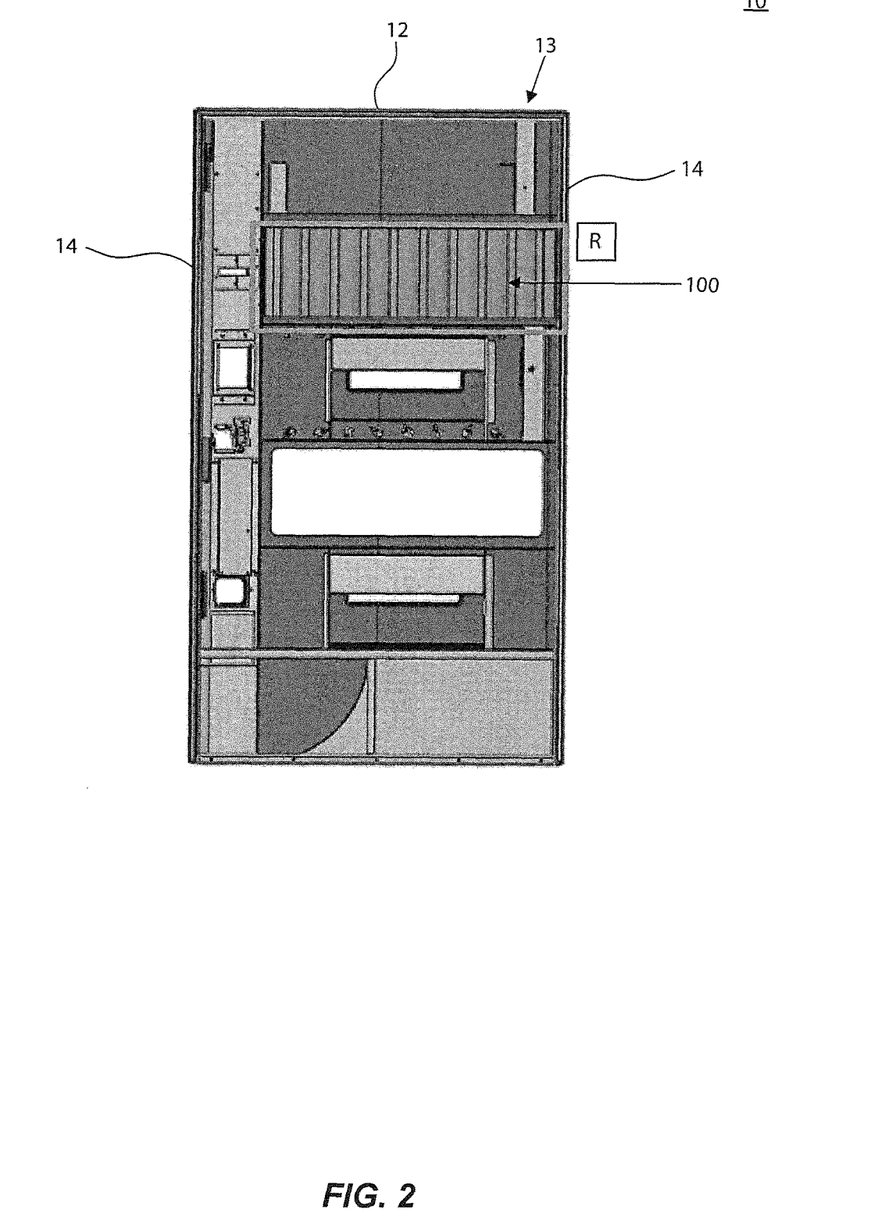
FIG. 2 shows a partial internal view of the product merchandising system of FIG. 1, showing a product display according to an embodiment.

In some embodiments, the product swatch display includes a tagged swatch reader (e.g., tagged swatch reader "R" shown in FIG. 2). In some embodiments, the product identifier is one of a product image, QR code, RFID tag, or flexible electronic display.

Some embodiments are directed to a product merchandising system. The product merchandising system may include a product display housing having a front surface; and a product display disposed proximate the front surface, the product display including: a product swatch frame having a plurality of convex surfaces extending towards a front surface and defining product swatch support surfaces configured to support a swatch including a product identifier; and a flange configured to position the swatch provided between an adjacent pair of convex surfaces. In some embodiments, the product merchandising system includes a tagged swatch reader (e.g., tagged swatch reader "R" shown in FIG. 2). In some embodiments, the product identifier is one of a product image, QR code, RFID tag, or flexible electronic display. In some embodiments, the housing is a vending machine housing. In some embodiments, the housing is a cooler housing.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

These and other embodiments are discussed below with reference to the figures. However, those skilled in the art will readily appreciate that the detailed description given herein with respect to these figures is for explanatory purposes only and should not be construed as limiting.

In some applications, vending machines or coolers may include visual images of products to be sold, rather than having a transparent surface to display the actual products. However, complexity of designs (e.g., numerous parts, hinges, doors, fasteners, etc.) makes it difficult and time consuming for operators to replace images in the field, increases risk of error, and drives up manufacturing and assembly costs.

Embodiments of the present invention improve upon prior indirect displays. Embodiments utilize an integrated design to allow product swatches to be supported without additional parts or obstruction. Additionally, embodiments maintain a shape (e.g., curvature for beverage bottles or cans) for a realistic effect.

Through use of these indirect displays, interiors of vending machines may be designed to accommodate interior components. Additionally, this type of configuration may be optimized to include a maximum amount of particular products in a particular space, without regard to outward appearance of the products to a consumer. Further, this configuration may allow for internal components of a machine to be altered or moved, for example, as modules to be reconfigured depending upon the need of the vendor or consumer. Thus, these systems may contribute to manufacturing and supply chain efficiency.

Figure 1:
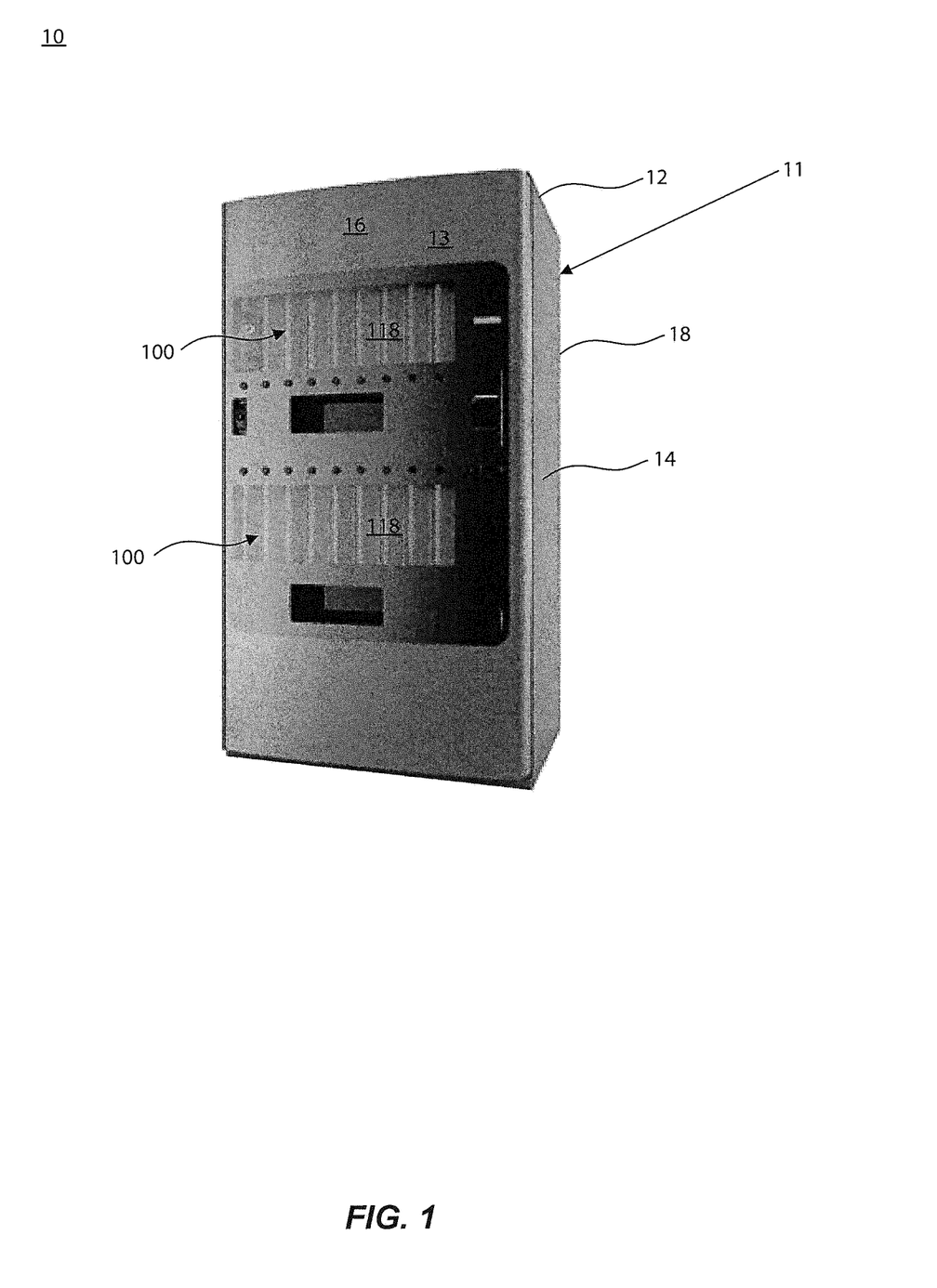
FIG. 1 shows perspective view of a product merchandising system according to an embodiment.

Some embodiments are drawn towards a product merchandising system 10, its systems, subsystems, components, or related methods. As shown in FIGS. 1-2, system 10 may include a cabinet-type housing having side surfaces 14, front surface 16 (e.g., which may include a door 13), top surface 12, and rear surface 18. Together, these surfaces may define an interior space that is configured to maintain a suitable environment within the housing. Additional cooling environments may be further defined within the interior space of product merchandising system 10 to take advantage of multi-zone cooling, for example, if a freezer compartment is included, or if different products require different temperatures for preservation or sale. In some embodiments, product merchandising system 10 may include a product support system supporting products (e.g., beverages or food products, for example). In some embodiments, this support system may not coincide with a particular placement or orientation of a product shown on a product display 100.

As discussed, product merchandising system 10 may include a housing 11 having top surface 12, two side surfaces 14 spaced apart from one another defining a width-direction of housing 11, front surface 16 and rear surface 18 spaced apart from one another defining a depth-direction of housing 11. These surfaces may be generally planar, or may include complex shapes. Generally, however, they may be referred with reference to other components to describe location with reference to the product merchandising system 10 and housing 11. Front surface 16 may include a transparent or translucent surface 118, showing a product display 100 behind it. In some embodiments, housing 11 is a vending machine housing. In some embodiments, housing 11 is a cooler housing.

Product merchandising system may include a product display 100. Product display 100 may be an indirect product display, such that it is configured to display or support an image, avatar, or indicator of a particular product to be sold.

Figure 3:
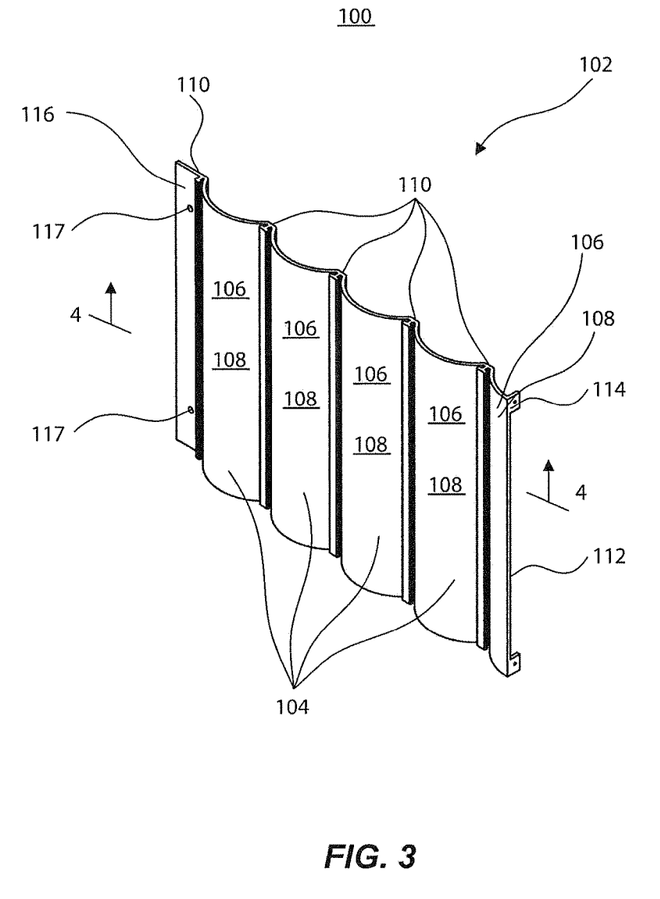
FIG. 3 shows a product display according to an embodiment.
Figure 4:
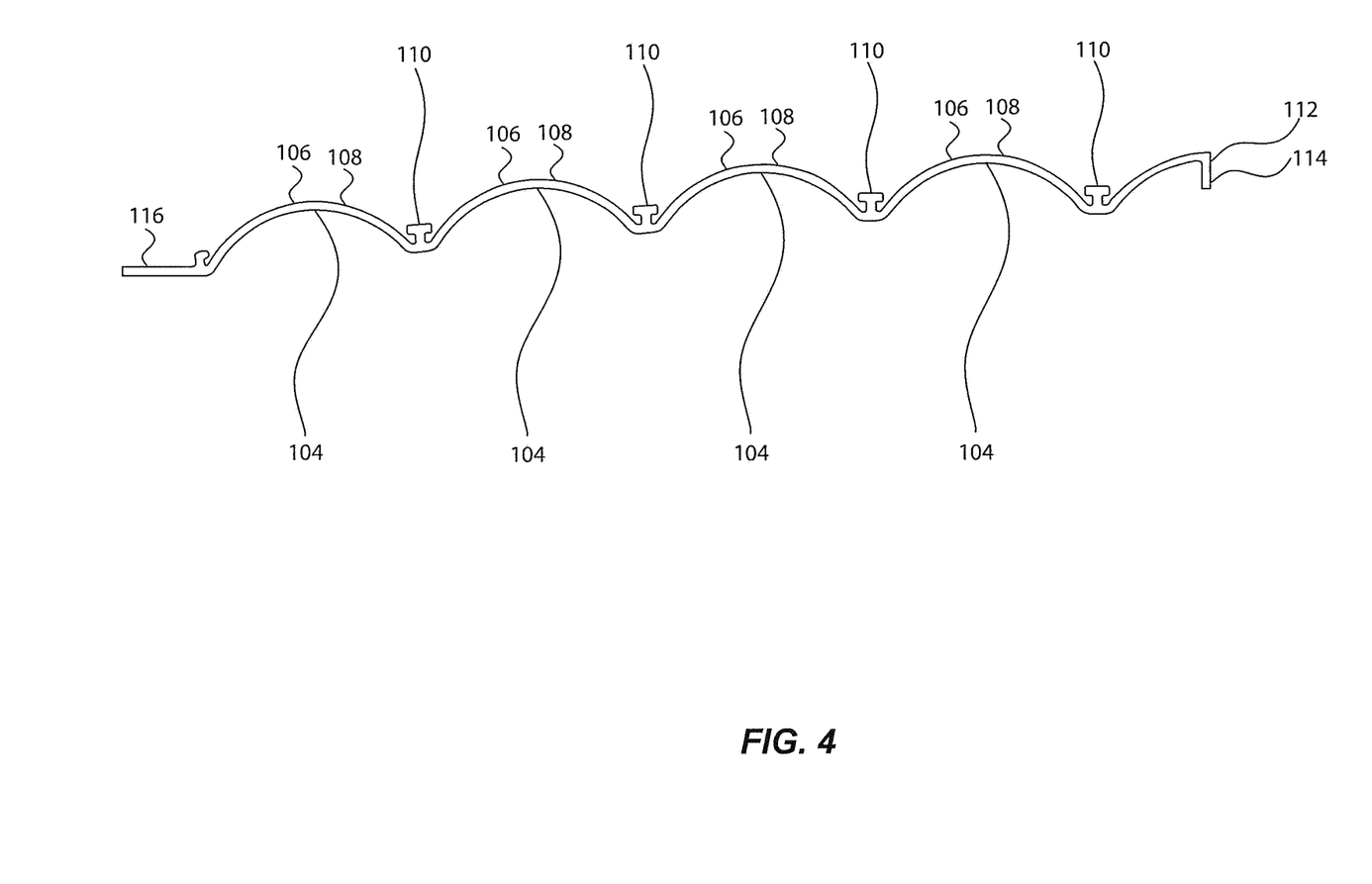
FIG. 4 shows a top sectional view of the product display of FIG. 3, taken along line 4-4 of FIG. 3.

As shown in FIGS. 3 and 4, for example, in some embodiments, product display 100 includes a product swatch frame 102 having a plurality of convex surfaces 104 extending towards a front surface 106. Convex surfaces 104 may define product swatch support surfaces 108, which are configured to support a swatch. A "swatch" as used herein includes a removable component which includes a product identifier (e.g., image, logo, color, avatar, or other indicator) for identifying a product for sale or display. In some embodiments, product swatch frame 102 includes a flange 110 configured to position the swatch provided between an adjacent pair of convex surfaces 104. In some embodiments, swatch frame 102 includes an edge structure 116 at a terminal end of the frame. Edge structure 116 may be configured to mate to housing 11, for example, at an interior space of front surface 16. In some embodiments, edge structure 116 includes a planar extension having fastener structure 117 (e.g., through-holes for screws, bolts, pins, snap-fit, or other suitable fasteners).

In some embodiments, flange 110 may be formed as a ridge, and may be integral to product swatch frame 102. In some embodiments, flange 110 is configured as a substantially T-shaped protrusion. In this regard, a first side of the protrusion is configured to support an edge of a swatch and a second side of the protrusion is configured to support an edge of a different swatch. For example, as shown in FIG. 4 for example, the leftmost substantially T-shaped flange 110 may support an edge of a swatch on the left side portion of the flange 110, and a different edge of a different swatch on the right side portion of the flange 110. For placement, the swatch may slide along the convex surface 104 such that it is slidably retained within the flange 110. In some embodiments, the elasticity of the swatch (e.g., elastic retention force) is configured to hold the swatch within the flanges 110 without the need for fastener (e.g., through friction or static forces). In this regard, the swatch/flange interface prevents accidental dislodgement while allowing easy removal and replacement of the swatch (for example, to change product offerings of system 10). In some embodiments, the flange 10 closest to edge 116 may be a partial flange, not including both sides of the "T" shape, as only one side of the flange at that position is required to support a swatch edge.

In some embodiments, the swatch may be made from a transparent or translucent material, for example, plastic. In some embodiments, the swatch is backlit, such that light may pass from behind the swatch and illuminate the product identifier. In some embodiments, frame 102 may be backlit. In some embodiments, the swatch may be backlit. In some embodiments, the swatch may include a light source. In some embodiments, frame 102 may include a light source, In some embodiments, the curvature of surfaces 106/108 may optimize light diffusion through a swatch, such that a realistic image of a product is displayed.

In some embodiments, product swatch frame 102 is an extruded component. In some embodiments, product swatch frame 102 is extruded plastic (e.g., ABS, PC, glass-filled PC, etc.). In this regard, a unitary product swatch frame 102 may be formed, minimizing parts required for display 100.

In some embodiments, a portion of the product swatch frame is processed to increase light diffraction.

In some embodiments, the swatch is held in place by friction between an edge of the swatch and the product swatch frame 102, for example, flange 110. In this regard, the swatch may be flexible, for example, a thin piece of plastic with a product image printed thereon. In some embodiments, the swatch may include a price, brand, product, or other image or identifier or indicator. In some embodiments, the swatch may include a "tag" (for example, an RFID tag, QR code, electronic display such as a flexible electronic display, or the like). In some embodiments, tags may be configured to provide computer instructions, information, signals, or data to system 10. In some embodiments, the swatch tag may be operatively connected to functions of system 10. System 10 may include a "tag reader," such as an RFID reader, which may utilize a processor to control various electromechanical systems of system 10. In some embodiments, display 100 may include a tag reader.

For example, the tagged swatch may indicate (e.g., audio or visual indication or alarm) to the system 10 or an operator where a particular product should be placed during loading. In some embodiments, tagged swatch may indicate quantities of particular products remaining, and send a message to an operator if a particular product is in need of restocking. In some embodiments, the tagged swatch may notify an operator if a product is placed in an incorrect location within system 10. In some embodiments, the tagged swatch may notify an operator if a it is placed in an incorrect location within display 100.

Figure 5:
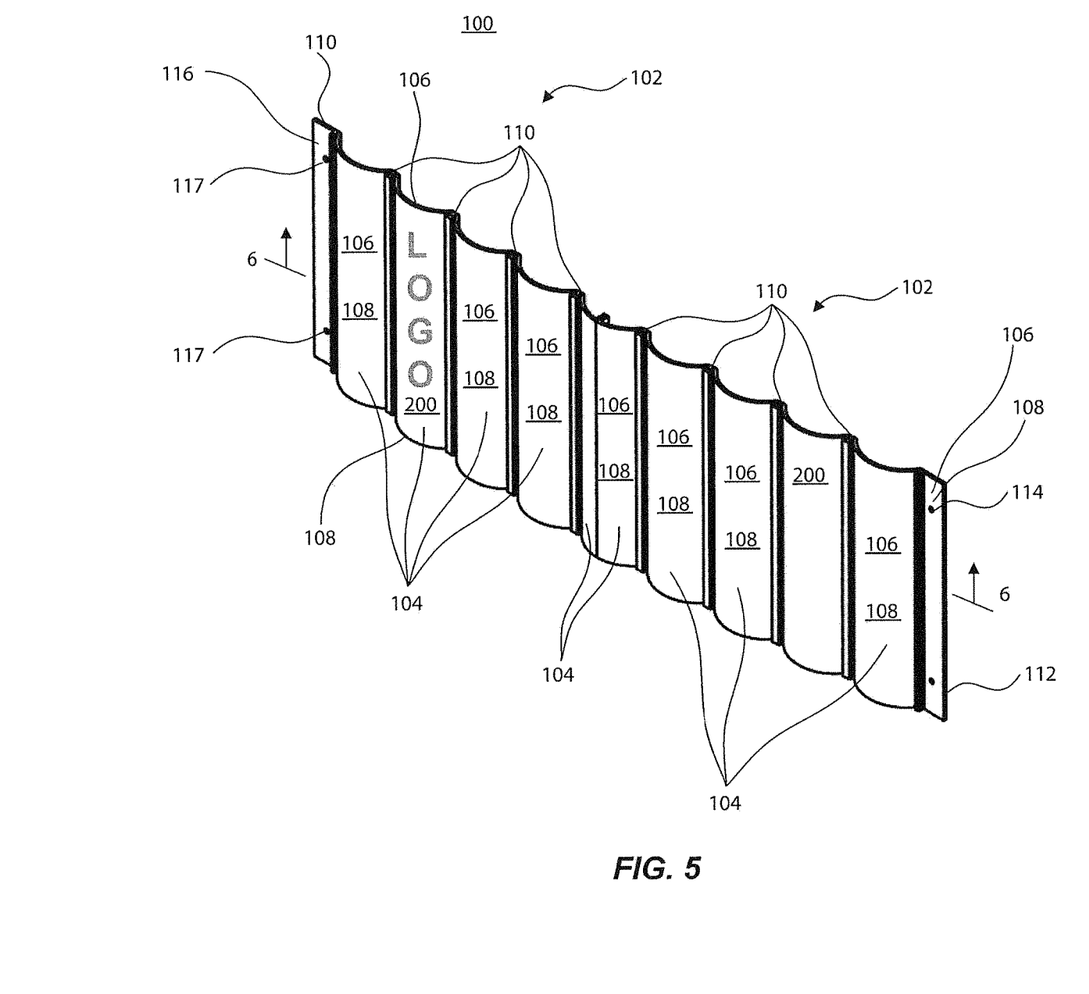
FIG. 5 shows a product display according to an embodiment.
Figure 6:
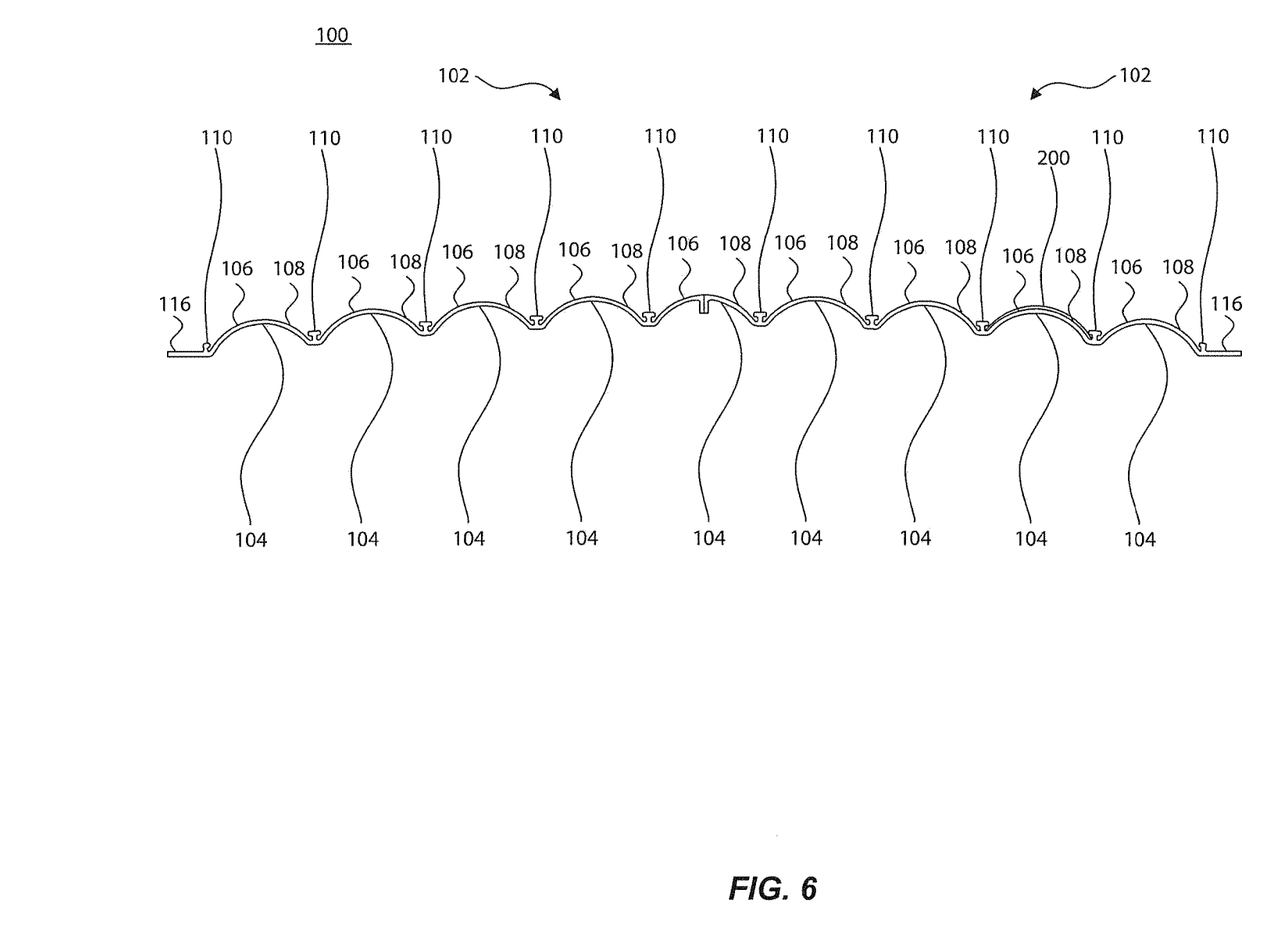
FIG. 6 shows a top sectional view of the product display of FIG. 4, taken along line 6-6 of FIG. 5.

As shown, in some embodiments, surface 106/108 may be truncated such that a whole swatch is not supported (as shown in FIG. 3, for example, on the right-most surface 108/106). In some embodiments, frame 102 includes terminal end 112 having a mating surface 114. As discussed below, mating surface 114 may be configured to coact with an opposing mating surface 114 of a second frame 102 to define one of the plurality of convex surfaces 106/108 (as shown in FIGS. 5 and 6). As an example, as shown in FIGS. 5 and 6, a swatch 200 may be provided and positioned as described herein. As shown in FIG. 5, for example, the swatch may have a product identifier (e.g., image, logo, color, avatar, or other indicator) for identifying a product for sale or display, represented in the figure with the word LOGO. In some embodiments, system 10 may include a second product swatch frame coacting or coupled with the first product swatch frame. In some embodiments, the frames 102 are symmetrical, such that each part may be formed using the same tooling. This increases the available size constraints of certain processes (e.g., plastic extrusion). As shown, frames 102 may be fastened together when in use in a system 10. In this regard, manufacturing and assembly costs are reduced, while serviceability is increased (due to the sole removable part being the swatches. In some embodiments, mating surface 114 may be a planar surface having a fastener structure (e.g., through-holes for screws, bolts, pins, snap-fit, or other suitable fasteners) to mate the two surfaces of the two frames 100 together.

Product merchandising system 10 may include at least one opening that provides access to products within housing 11, such as door 13. A thermo-protective barrier (e.g., insulation) may be applied to the various structures that make up the product merchandising system in order to increase thermal efficiency. The thermo-protective barrier may include a glass door, a thermo-protective barrier (such as a sheet designed to retractably extend across the opening), a separate ventilation system designed to maintain a protective air barrier across the opening, and the like. The thermo-protective barrier may extend across any portion of an opening. For example, the thermo-protective barrier may be a curtain that extends across the opening. In another example, the thermo-protective barrier may be a plastic or glass door that extends across the opening. The door may be opened via a hinge configuration, a sliding door configuration, or other suitable arrangement. Product display 100 may be configured to be positioned within a portion of the door 13. Transparent covering 118 may be positioned on an exterior surface of door 13, and allows product display 100 to be viewed by a consumer. In some embodiments, transparent covering 118 may be removable, to provide easy access to replace or change swatches.

As described, product merchandising system 10 may be configured to maintain a suitable temperature for storing and/or displaying products, such as beverages, within housing 11 viewed through a portion of front surface 16 (such as a glass door) of housing. In other applications, product merchandising system 10 may be a vending machine with no products visible to a consumer. The product merchandising system 10 may also be configured to maintain additional environmental characteristics of the interior of housing 11, such as humidity, ventilation, air pressure, and the like. In some embodiments, product display 100 may allow for direct display of a particular product, for example, by not positioning a swatch on a particular surface 106/108. As shown in FIG. 1 for example, system 10 may include multiple product displays 100 to allow for additional variety or duplicate products to be displayed.

In some embodiments, the system may be operated entirely by an attendant, rather than a consumer.

In some embodiments, a tag (e.g., barcode, RFID tag, or the like as discussed above) may be coupled to a product and be configured to indicate to the product merchandising system 10 control attributes such as the temperature control, presence or absence of the product within housing 11, or relative positioning of the product within the housing.

In some embodiments, the product merchandising system 10 may include a receiver and/or transmitter (e.g., tag reader) that may communicate with a customer or attendant device (e.g., phone, smartphone, tablet, smart watch, etc.). In some embodiments, this communication may allow, for example, an attendant to monitor the position of swatches within display 100. In some embodiments, this communication may include instructions on how to use the system, or may include a transactional component, for example, purchasing a beverage through a user interface on the consumer's device. In some embodiments, product merchandising system 10 may include a network, such as, for example, a "cloud" or Internet such that the connected device (e.g., consumer or attendant device) and/or components of the product merchandising system 10 may communicate over the network (e.g., to monitor the temperature of the front rows of products). Communication between the components may be one-way or multi-way communication.

In some embodiments, the product may be provided to the consumer from a store attendant. In other embodiments, the product may be dispensed to the consumer through a vending machine operation. In some embodiments, the product merchandising system 10 may include an integrated point-of-sale ("POS") payment system that would dispense the product requiring very little to no interaction from a store attendant.

In some embodiments, this communication may provide customization according to prior customer preferences. For example, when a consumer is within a relatively close distance to the product merchandising system 10, such as within a retail location, the consumer may receive a message on their device with information on special limited time offers, promotions, special flavors available, or the like. In another example, a consumer may prefer Beverage A, when a consumer is within a relatively close distance to product merchandising system 10, the consumer may receive a message on their device informing the consumer where a product merchandising system 10 containing Beverage A may be found and/or purchased. In this regard, tagged swatches may provide indication to a swatch reader that a particular number of Beverage A's may be found in a particular system 10.

Examples of various social media and other communication features available for incorporation to the instant systems and methods can be found in U.S. Patent Application Publication No. 2013/0096715, which is hereby incorporated by reference in its entirety. For example, in some embodiments, the systems may be configured to receive instructions in connection with a gift a beverage from one individual to another individual, or provide an interface that allows a recipient of a gift, coupon, or promotion, to hear and/or see an audio, text, and/or video message, such as a message of the party who sent the gift, coupon, or promotion to the recipient, for example between multiple devices.

In some embodiments, the interfaces and communication between systems and/or devices may be networked together through a communications network. Communications network may include, for example: 1) a local area network (LAN); 2) a simple point-to-point network (such as direct modem-to-modem connection); and/or 3) a wide area network (WAN), including the Internet and other commercial based network services. In one aspect, the interfaces and/or devices may be connected to social media computer through communications network or using various protocols, such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, fourth-generation (4G) cellular data communications, Global System for Mobile communications (GSM), or other wireless communication networks or the like may be used as the communications protocol. The interfaces and communication between systems and/or devices may be physically connected to each other or one or more networks via twisted pair wires, coaxial cable, fiber optics, radio waves or other media. In an aspect, known standard protocols may be used, including Flash, HTML5, etc.

The term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks. A "network," as used herein, may also include a network of "virtual" servers, processes, threads, or other ongoing computational processes which communicate with each other, some or all of which may be hosted on a single machine which may provide information to client servers, processes, threads or other ongoing computational processes on that same machine, other machines, or both.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The Detailed Description section is intended to be used to interpret the claims. The Summary and Abstract sections may set forth one or more but not all exemplary embodiments of the present invention as contemplated by the inventor(s), and thus, are not intended to limit the present invention and the claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined in accordance with the claims and their equivalents.

What is claimed is:

1. A product display, comprising:
a product swatch frame having a convex surface extending towards a front surface of the product display and defining a product swatch support surface configured to support a swatch including a product identifier, the swatch frame including an edge structure at a terminal end of the frame and configured to mate to a product display housing; and
a flange configured to position the swatch provided between an adjacent pair of convex surfaces.

2. The product display of claim 1, the product swatch frame having a plurality of convex surfaces extending towards a front surface and defining product swatch support surfaces configured to support a swatch including a product identifier.

3. The product display of claim 1, further comprising:
a second product swatch frame having a plurality of convex surfaces extending towards a front surface and defining a product swatch support surface configured to support a swatch including a product identifier; and
a flange configured to position the swatch provided between an adjacent pair of convex surfaces, wherein each of the first and second product swatch frame include a terminal end having a mating surface configured to couple with the opposing mating surface to define one of the plurality of convex surfaces.

4. The product display of claim 3, wherein the convex surface defined by the first and second product swatch frames defines a product swatch support surface, and wherein a first flange configured to locate the swatch is provided on the first product swatch frame and a second flange configured to locate the swatch is provided on the second product swatch frame.

5. The product display of claim 1, wherein the flange is configured as a substantially T-shaped protrusion such that a first side of the protrusion is configured to support an edge of a swatch and a second side of the protrusion is configured to support an edge of a different swatch.

6. The product display of claim 1, wherein a portion of the product swatch frame is processed to increase light diffraction.

7. The product display of claim 1, wherein the swatch is held in place by friction between an edge of the swatch and the product swatch frame and is removable.

8. The product display of claim 1, wherein the product swatch frame is extruded plastic.

9. The product display of claim 1, further comprising:
a tagged swatch reader.

10. The product display of claim 1, wherein the product identifier is one of a product image, QR code, RFID tag, or flexible electronic display.

11. A product merchandising system, comprising:
a housing having a front surface; and
a product display disposed proximate the front surface, the product display including:
a product swatch frame having a plurality of convex surfaces extending towards the front surface and defining product swatch support surfaces configured to support a swatch including a product identifier, the swatch frame including an edge structure at a terminal end of the frame and configured to mate to a product display housing; and a flange configured to position the swatch provided between an adjacent pair of convex surfaces.

12. The system of claim 11, wherein the flange is configured as a substantially T-shaped protrusion such that a first side of the protrusion is configured to support an edge of a swatch and a second side of the protrusion is configured to support an edge of a different swatch.

13. The system of claim 11, wherein a portion of the product swatch frame is processed to increase light diffraction.

14. The system of claim 11, wherein the swatch is held in place by friction between an edge of the swatch and the product swatch frame and is removable.

15. The system of claim 11, wherein the product swatch frame is extruded plastic.

16. The system of claim 11, further comprising:
a second product swatch frame coacting with the first product swatch frame.

17. The system of claim 11, further comprising:
a tagged swatch reader.

18. The system of claim 11, wherein the product identifier is one of a product image, QR code, RFID tag, or flexible electronic display.

19. The system of claim 11, wherein the housing is a vending machine housing.

20. The system of claim 11, wherein the housing is a cooler housing.

* * * * *